Dec. 29, 1953   S. R. JOHNSON ET AL   2,664,216
CAN BAG UNLOADING METHOD AND APPARATUS
Filed June 20, 1949   12 Sheets-Sheet 5

Inventors
Scott R. Johnson &
Edwin G. Blaing-Leisk
By
Mason, Porter, Diller & Stewart
attys.

Dec. 29, 1953     S. R. JOHNSON ET AL     2,664,216
CAN BAG UNLOADING METHOD AND APPARATUS

Filed June 20, 1949     12 Sheets-Sheet 7

Inventors
Scott R. Johnson &
Edwin G. Blaing-Leisk

By
Mason, Porter, Diller & Stewart
Attys.

Dec. 29, 1953 S. R. JOHNSON ET AL 2,664,216
CAN BAG UNLOADING METHOD AND APPARATUS
Filed June 20, 1949 12 Sheets-Sheet 8

Inventors
Scott R. Johnson &
Edwin G. Blaing-Leisk
By
Mason, Porter, Diller & Stewart
attys.

Dec. 29, 1953  S. R. JOHNSON ET AL  2,664,216
CAN BAG UNLOADING METHOD AND APPARATUS
Filed June 20, 1949   12 Sheets-Sheet 11

Inventors
Scott R. Johnson &
Edwin G. Blaing-Leisk
By
Mason, Porter, Diller & Stewart
attys.

Dec. 29, 1953  S. R. JOHNSON ET AL  2,664,216
CAN BAG UNLOADING METHOD AND APPARATUS
Filed June 20, 1949  12 Sheets-Sheet 12

Inventors
Scott R. Johnson &
Edwin G. Blaing-Leisk
By
Mason, Porter, Diller & Stewart
attys.

Patented Dec. 29, 1953

2,664,216

UNITED STATES PATENT OFFICE 2,664,216

CAN BAG UNLOADING METHOD AND APPARATUS

Scott R. Johnson, River Forest, and Edwin G. Blaing-Leisk, Chicago, Ill., assignors to Continental Can Company, Inc., New York, N. Y., a corporation of New York Application June 20, 1949, Serial No. 100,268

13 Claims. (Cl. 214—8.5)

1

The invention relates generally to the art of handling unfilled open cans and primarily seeks to provide a novel method of and apparatus for unloading the cans from bags in which they are packaged for storage and distribution to canners.

In the can manufacturing art great progress has been made in the production of efficiently operating body making and bottoming machinery, and cans are manufactured with great rapidity. The production of efficiently operating can handling methods and apparatus have not kept pace, and much wastage of time and labor is entailed in the handling of cans after they have been manufactured. It is commonly known that the cost of handling manufactured cans is greater than the cost of manufacturing the cans. For example, it has long been the practice to hand fork the cans into the cars by which they are transported, and from said cars or conveyor means into storage bins. This can handling practice presented many problems such as the necessity of employing workers skilled in the forking of the cans, of providing runways, or cableways to the cars and from the cars to storage bins, and of providing special, space consuming bins, not to speak of the necessity of so handling the cans seasonally, with resulting shortage of cars. Some progress has been made in relieving these conditions by packaging the cans in bags for shipment and storage, and some novel methods of and apparatus for so packaging the cans have been devised. These last mentioned methods of packaging the cans in bags or self contained units provide marked advantages because no special skill is required in handling the bags, no special storage space is required and the can bags can be handled, loaded and unloaded, as unit packages, rapidly and without the need of using individual can runways or cableways. Moreover, the packaging of the cans in bags permits storage in advance of season, a very valuable asset in relieving car shortage. However, in order to derive full benefit from the packaging of cans in bags, efficient methods and apparatus for unloading the cans from the bags must be made available so as to make cans in such packages practical and attractive to the customer. It is the purpose of the present invention to provide a novel and efficient method and apparatus for unloading the cans from the bags in which they are packaged, shipped and stored.

An object of the invention is to provide a novel method of unloading cans from a bag wherein the cans are arranged in multiple independent tiers with their axes in parallel relation, the method including the steps of placing the bag in a confining receiver or mold with the can axes in generally horizontal position, removing the bag to leave the bag complement of cans confined against rolling in said mold, then pushing said cans in the direction of their axes to discharge them tier-by-tier from the mold to roll away by gravity action tier-after-tier.

Another object of the invention is to provide a novel method of unloading cans from a bag wherein the cans are arranged in multiple independent tiers with their axes in parallel relation, the method comprising removing at least one face of the bag to expose can sides through the open bag side, placing the bag with the exposed cans in a confining mold, the can axes being in substantially upright position, tilting the mold with the bag and cans therein to place the cans with their axes in generally horizontal position, removing the bag from the cans to leave them confined against rolling in the mold, then pushing said cans in the direction of their axes to discharge them tier-by-tier from the mold to roll away by gravity action tier-by-tier.

Another object of the invention is to provide a method of the character stated wherein as each tier of cans is pushed from the mold it is received on a generally horizontal support effective to prevent free falling of the cans for any material distance, and then said support is tilted to allow the tier of cans to roll away.

Another object of the invention is to provide a novel apparatus for practicing a can bag unloading method of the character stated.

Another object of the invention is to provide a novel apparatus of the character stated wherein are provided a table whereon to support a bag of cans with the can axes upright while a face of the bag is removed to expose can sides through the open bag side, a U-shaped mold placeable about the bag on the table with the base of the U closing over the cans exposed through the open bag side and the upright walls of the U opposing two opposite bag sides against which can sides lie, said mold being tiltable with the bag and cans therein into position for placing the cans with their axes in generally horizontal position, and said bag being removable from the mold after the tilting thereof to leave the cans supported by the U base and confined against rolling by the upright walls of the U, and a ram movable through the mold for pushing the can tiers therefrom tier-by-tier to roll away by gravity.

Another object of the invention is to provide an apparatus of the character stated wherein there is included a floor on which to receive the successively discharged can tiers with the cans in a generally horizontal position, thereby to prevent free falling of the cans for any material distance, said floor being tiltable to allow the cans to roll away by gravity.

Another object of the invention is to provide an apparatus of the character stated in which the bag supporting table is mounted at a receiving station, the ram is mounted at a discharging station spaced from the receiving station, and the mold is slidable back and forth to receive the bag and cans at the receiving station whereat the bag is removed and move them to the discharging station where the ram is moved through the mold step-by-step to discharge the cans therefrom tier-by-tier.

Another object of the invention is to provide an apparatus of the character stated in which the mold is swingably mounted so as to be swingable over the table at the receiving station to properly embrace the bag of cans while it is supported on said table, and said table is swingably mounted so as to be swingable with the mold to tilt the bag and move the cans from a position in which their axes are upright to one in which they are lying on their sides with their axes in generally horizontal position.

Another object of the invention is to provide an apparatus of the character stated in which the ram is power operated, and in which are included safety control devices necessitating the use of both hands in bringing about operation of the ram, and thereby making it impossible for an operator to have his hand crushed by the ram.

With the above and other objects in view that will hereinafter appear, the nature of the invention will be more clearly understood by reference to the following detailed description, the appended claims and the several views illustrated in the accompanying drawings.

Figure 1:
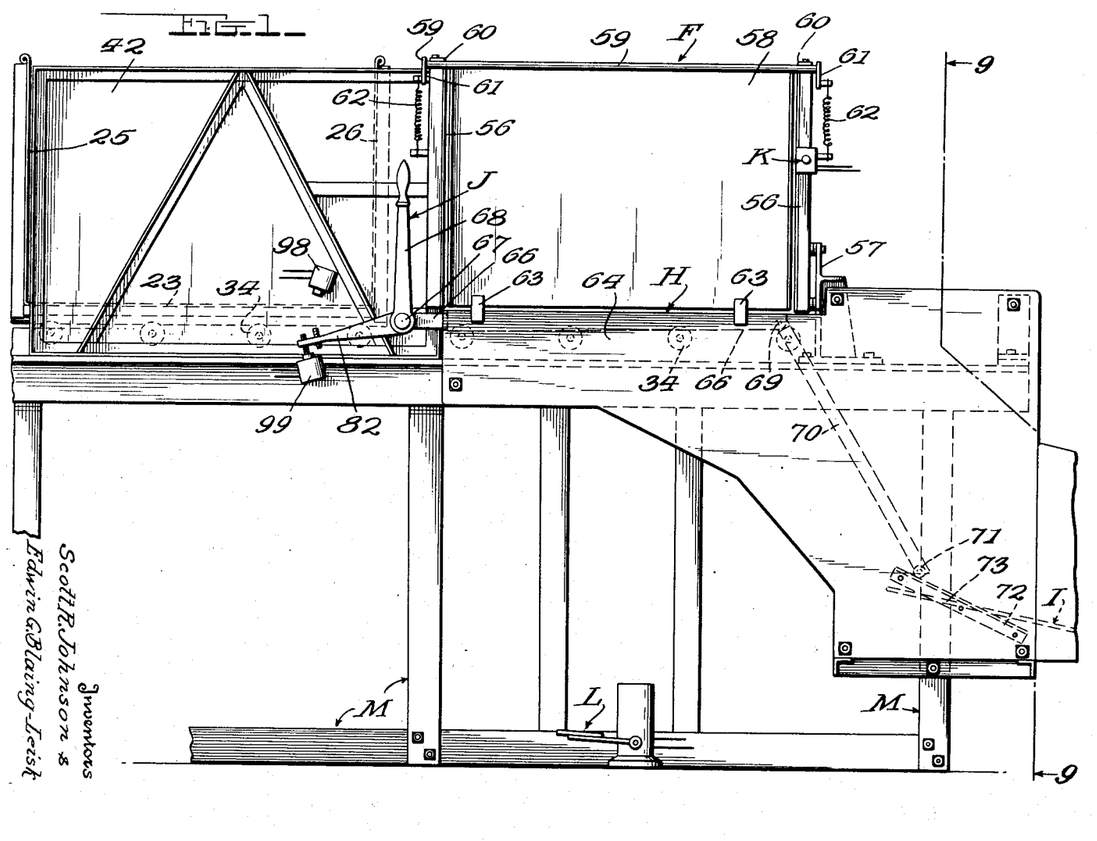
Figure 1 is a face view of an apparatus embodying the invention and adapted for practicing the improved method of unloading can bags.
Figures 2, 2A:
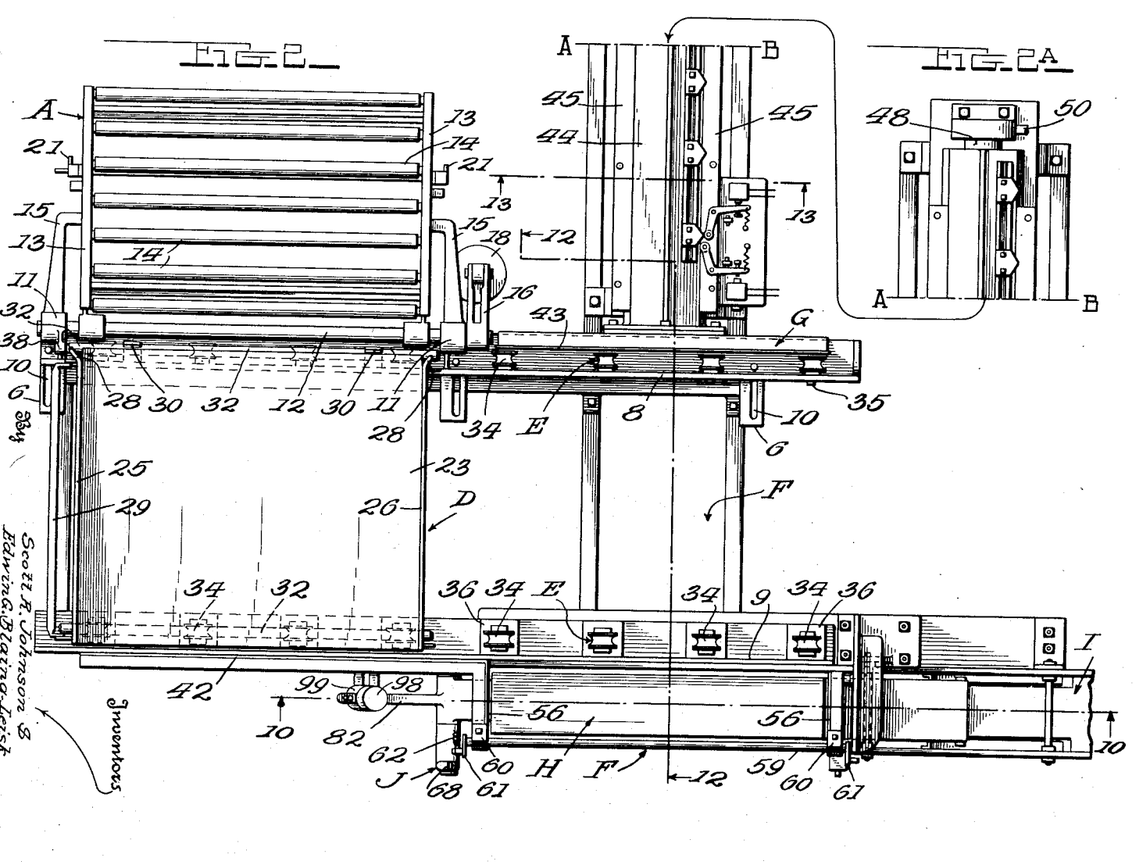
Figures 2 and 2a when considered as connected at the lines A—B together comprise a plan view of the apparatus shown in Figure 1.
Figure 9:
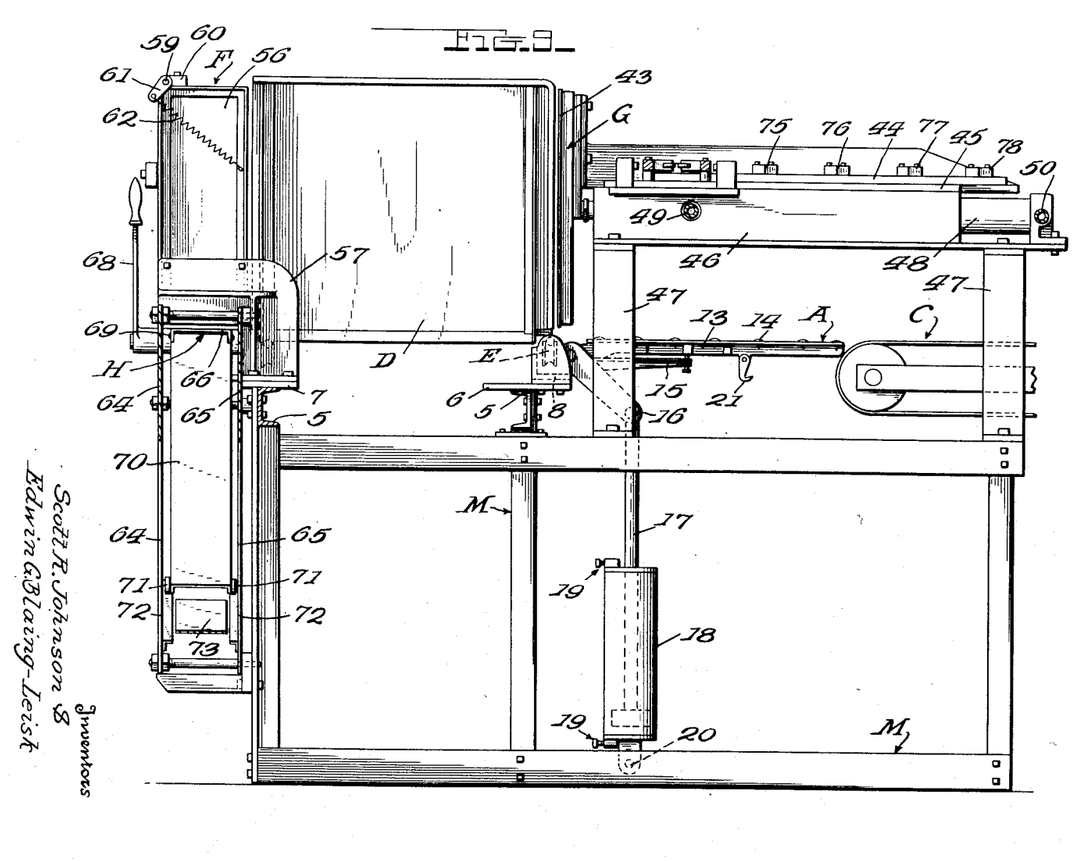
Figure 9 is a vertical cross section taken on the line 9—9 on Figure 1.

In the example of embodiment of the invention herein disclosed, there is included a can bag receiving station or table A intended to receive a bag of cans B, manually or from a conveyor C in the manner clearly illustrated in Figures 2 and 9 of the drawings. The bag mold D is swingably and slidably mounted beside the table A and is shiftable along the slideway or rollway generally designated E between the receiving station and a discharge station F whereat there is provided a reciprocable plunger or pusher G adapted to push tiers of cans, tier-by-tier from the mold D onto a discharge platform H. The discharge platform H is normally disposed in a horizontal receiving position as illustrated in dotted lines in Figure 1 and full lines in Figure 10, and is tiltable to an inclined position as illustrated in dotted lines in Figure 10 for causing the cans of the successively discharged tiers to gravitate onto a take-away chute or conveyor I as indicated in said Figure 10.

Figure 18:
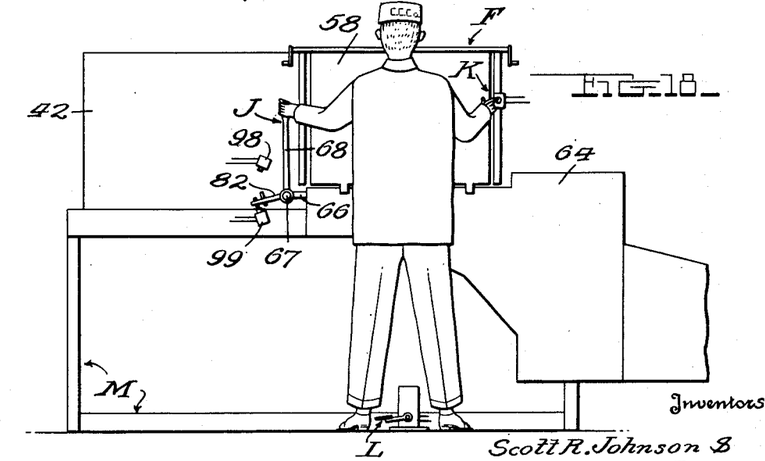
Figure 18 is a somewhat diagrammatic face view illustrating the arrangement of the manual controls effective to assure the safety of an operator.

It will be apparent by reference to Figure 18 of the drawings that the apparatus includes hand controls generally designated J and K and a foot control generally designated L. The method of operating the control device is such that both hands of the operator must simultaneously engage and actuate the hand controls J and K in effecting an operation of the can tier discharging ram or pusher, and by this means it is impossible for an operator to get his hand caught between the ram and other parts of the apparatus during the discharging of cans. The various operating device of the apparatus are mounted on suitable frame structure generally designated M.

Figure 3:
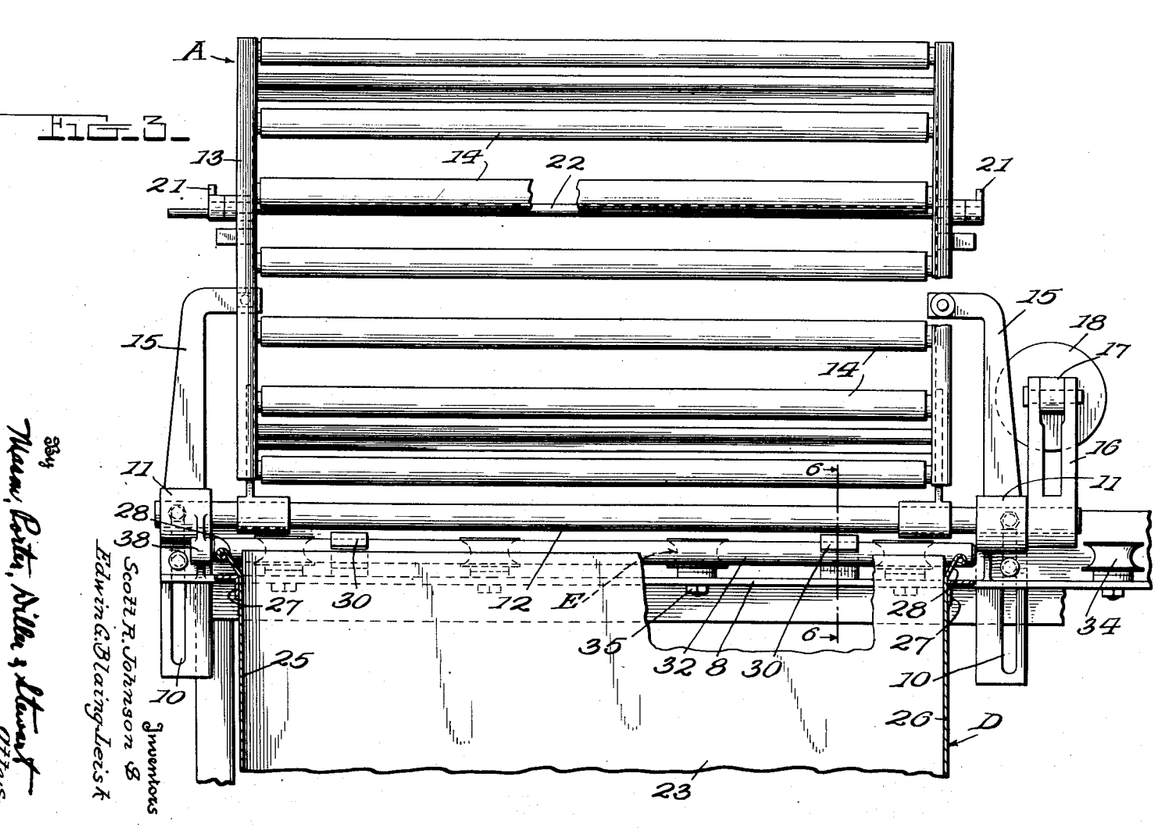
Figure 3 is an enlarged fragmentary plan view illustrating the swingably mounted bag supporting table and a portion of the swingably mounted bag can complement receiving and shifting mold, the latter being shown in horizontal cross section.
Figure 4:
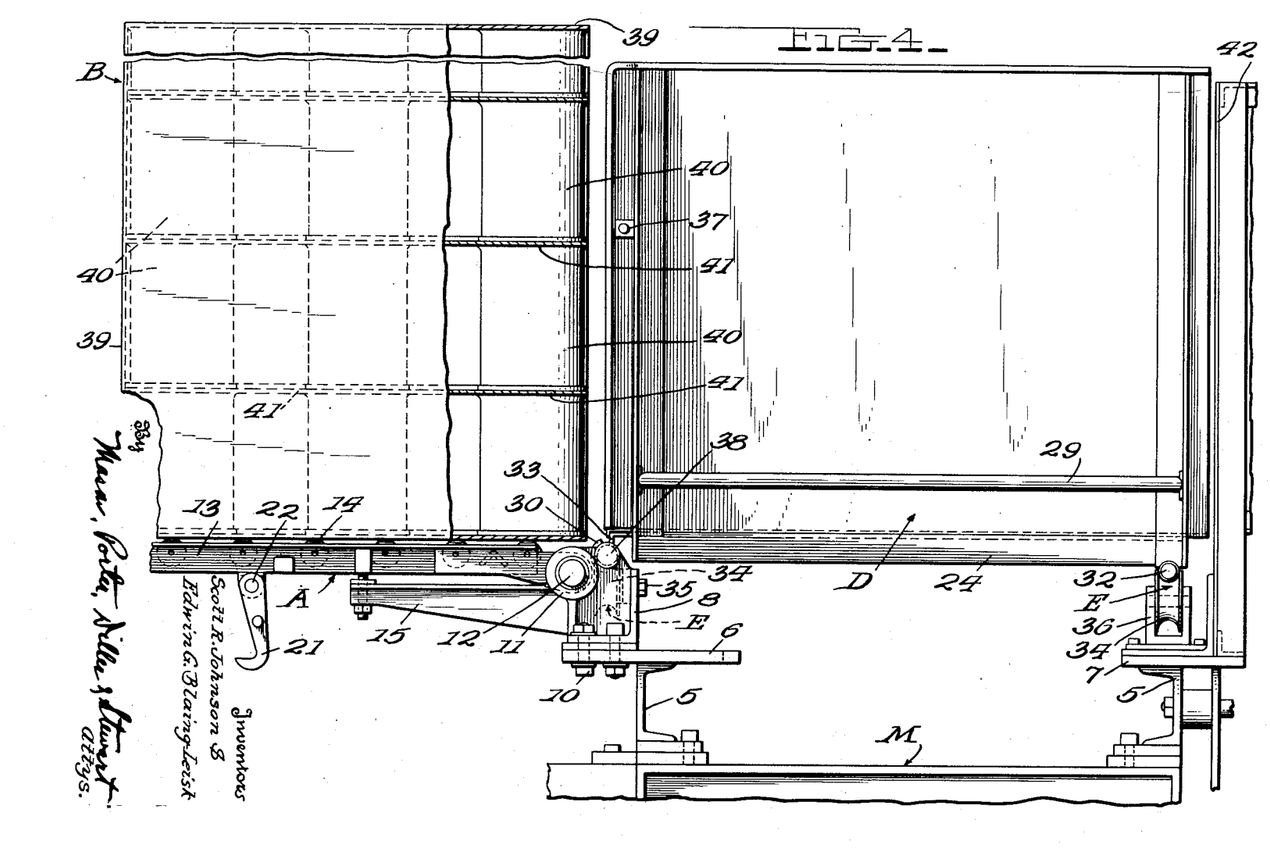
Figure 4 is a left end elevation showing the table and bag mold, a bag of cans being shown on the table with the wall thereof adjacent said mold being removed to expose the cans, and a portion of the bag and its intermediate separator or tier sheets being shown in vertical cross section.
Figure 5:
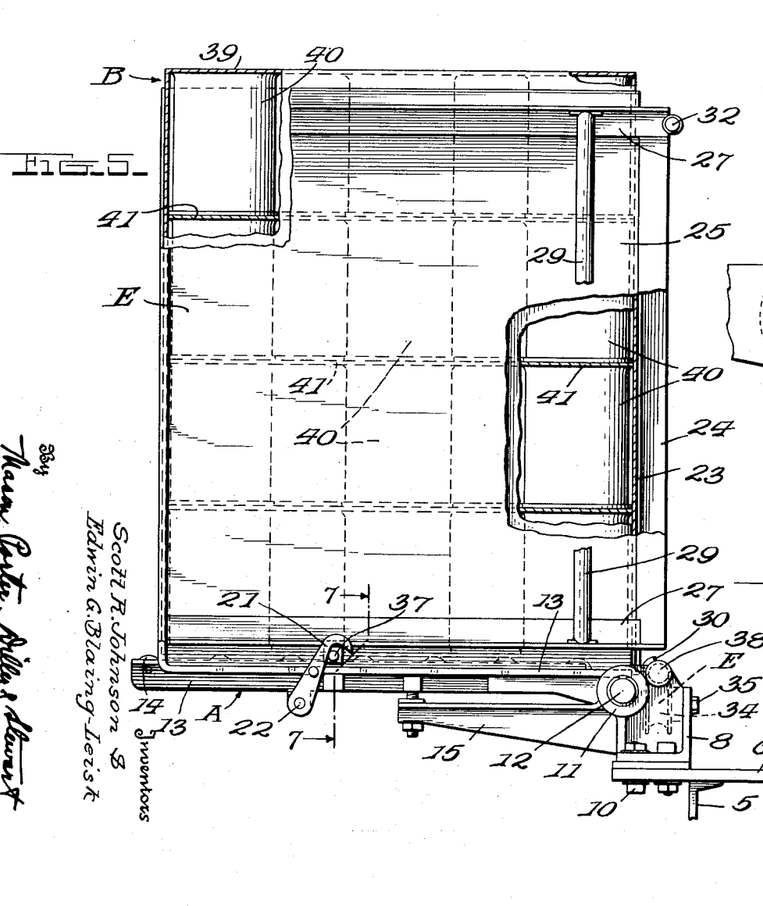
Figure 5 is a view similar to Figure 4, the mold being shown as swung over the bag of cans.
Figure 6:
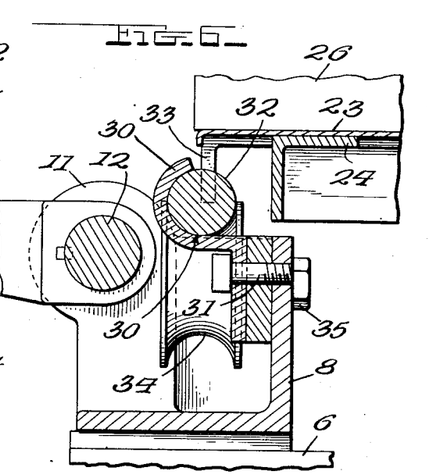
Figure 6 is a fragmentary vertical cross section taken on the line 6—6 on Figure 3.
Figure 7:
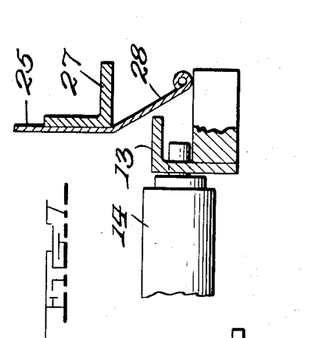
Figure 7 is a fragmentary vertical cross section taken on the line 7—7 on Figure 5.

The frame structure includes longitudinally disposed parallel channel members 5 whereon are mounted support members 6 and 7 in the manner clearly illustrated in Figures 2, 4, 5, 6 and 9 of the drawings. An angle iron 8 is supported longitudinally on the support members 6 and an angle iron 9 is similarly supported on the support members 7. The angle 8 may be laterally-adjustably mounted as at 10 on the supports 6 and carries bearings 11 in which a shaft 12 is rockably mounted. See Figures 2, 3, 5 and 6 of the drawings. To the shaft 12 are affixed the side arms 13 of the receiving table structure A, and said table includes the rollers 14 extending across between and having trunnion bearing in the arms 13. The table structure is adapted to rest on projecting support arms 15 when in its lowered position as illustrated in Figures 2, 3 and 5 of the drawings, and the shaft 12 has a crank arm 16 secured thereon and connected with a plunger 17 which is vertically reciprocable in a dash-pot cylinder 18 having adjustably restricted outlets 19 at its upper and lower ends. See Figures 3 and 9. The cylinder is mounted as at 20 on the frame structure M and the purpose of this dash-pot arrangement will be described hereinafter. It will also be noted that the table is equipped with hooks 21 which are secured on a cross rod 22 pivotally mounted on the table arm 13, and the purpose of these hook devices also will be described hereinafter.

The bag mold D takes the form of a U-shaped receiver including a bottom 23 reinforced by angles 24 and upstanding sides 25 and 26 also having reinforcing angles 27 secured thereto, as will be apparent by reference to Figures 3, 4, 5, 8 and 12. The bag mold sides 25 and 26 preferably are flared at their receiving ends disposed toward the table in the manner illustrated at 28 in Figure 3, and the side 25 has a handle 29 secured thereto to facilitate swinging of the mold about its pivotal support.

The pivotal mounting for the mold is provided by two curved brackets 30 which are secured as at 31 to the angle 8 at the receiving station in the manner best illustrated in Figures 3, 5, 6 and 8 of the drawings. The brackets 30 serve as pivot retainers for a rod 32 which is secured as at 33 along the mold bottom. A similar rod 32 is secured in like position along the other side of the mold bottom, as will be apparent by reference to Figures 2 and 12. The mold rods 32 are adapted to rest upon and travel over rollers 34 placed along each side of the guideway generally designated E, those along one side being mounted as at 35 on the angle 8, and those along the other side being mounted in brackets 36 on the angle 9. It will be apparent by reference to Figure 2 that the rollers 34, or in other words the feedway generally designated E, extends between the can bag receiving station A and can bag discharging station F.

When the mold has been moved to the position opposite the receiving station as shown in Figures 2, 3 and 5, the rod 32 nearest the table A will have been moved into the hooks or curved brackets 30 so that the mold can be swung from its horizontal position illustrated in Figures 2 and 4 to its upright position over the receiving table A as shown in Figure 5. This may be conveniently accomplished by manipulation of the handle 29. It will be noted that the mold is equipped with hook receiving pins 37, and that the mold rod 32 nearest the table A is disposed to come against a bracket stop 38 as shown in Figures 3 and 5 in position for properly aligning the mold with the table A and the mold pins 37 with the table hooks 21 so that after the mold has been swung up to the position shown in Figure 5 the hooks 21 can be engaged over the pins 37, and thereafter the mold can be swung back to its horizontal position, the table A swinging upwardly therewith to the position illustrated in Figure 8.

Figure 8:
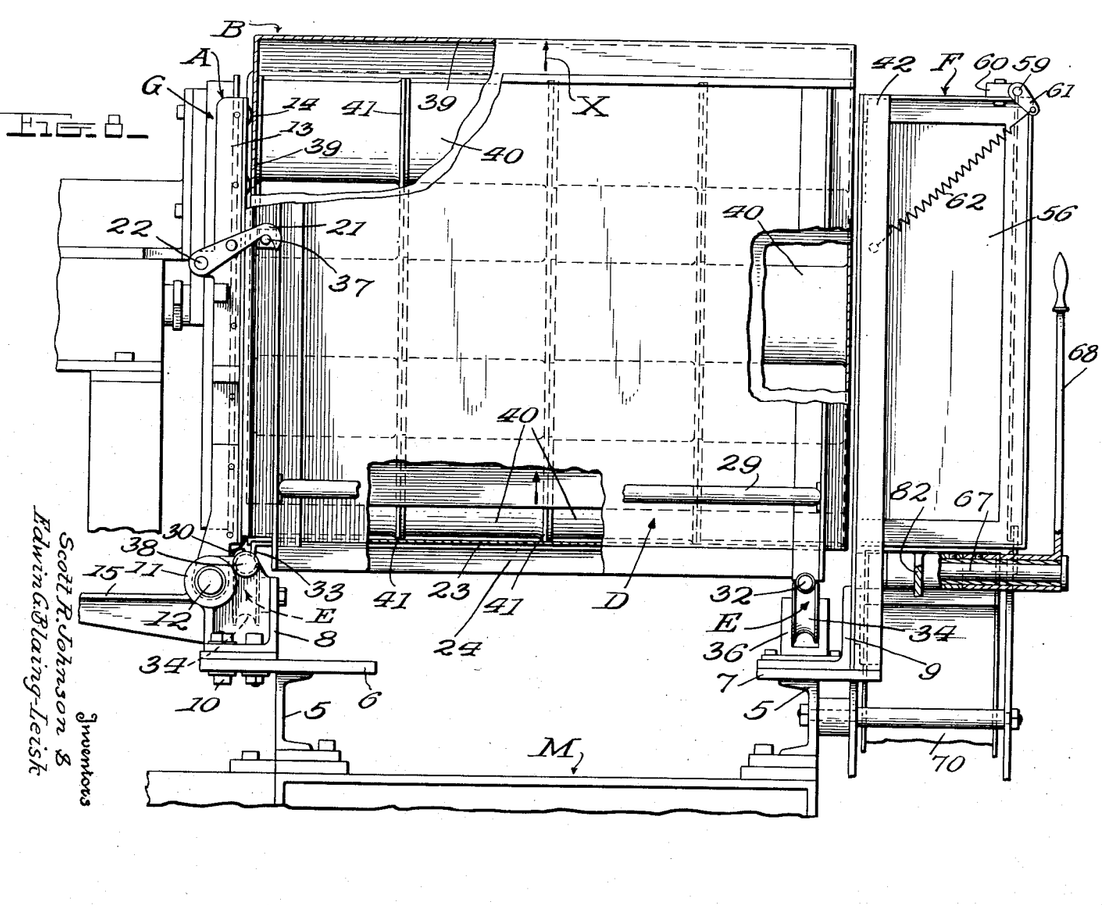
Figure 8 is a view similar to Figure 4 illustrating the table and bag mold swung into position for placing the bag with the cans exposed through the removed bag wall at the mold bottom, parts being broken away and in section showing the bag in the process of being removed upwardly off the complement of cans deposited in the mold.

In Figures 4, 5 and 8 of the drawings a bag of cans generally designated B is shown, and this takes the form of a paper bag 39 wherein the tiers of cans 40 are separated by tier sheets 41.

A rigid facing wall 42 is supported on the frame opposite the mold when it is at the receiving station as is clearly illustrated in Figures 2, 4 and 8 of the drawings. This wall assures against displacement of the can bag from the mold as the mold and the connected table are swung from the position illustrated in Figure 5 to the position illustrated in Figure 8, and during the swinging of the mold and table to said position, and the swinging of the table back to its receiving position shown in Figures 2 and 4, the dash-pot means 16, 17, 18, 19 serves to suitably cushion the movement of the parts.

At the discharge station F there is provided the plunger or pusher G which comprises a pusher head 43 and the slide carrier 44 which is slidably guided as at 45 on the support housing 46 which is mounted on frame supports 47. See Figures 2, 2a, 12 and 13. The desired reciprocation of the plunger or pusher 43 is accomplished by fluid pressure application. A fluid pressure cylinder 48 is provided and supported in the manner illustrated in Figures 12 and 13 in the support housing 46, and pressure and exhaust lines 49 and 50 connect the cylinder with an automatically controlled solenoid valve 51 in the manner clearly illustrated in Figure 14. A supply line 52 connects the valve 51 with a suitable pump 53.

A piston plunger 54 is reciprocable in the pressure cylinder 48 and is suitably connected with the ram or pusher head 43, as by the universal couple 55. Opposite the pusher head there is provided a can tier receiving chamber which is composed of side walls 56 supported as at 57 on the frame, said chamber being open toward the pusher and the mold when the latter is slid into position at the discharge station F but closed at its outer face by a wall 58 in the manner clearly illustrated in Figures 1, 2, 9 and 12. The face wall 58 has trunnions 59 projecting endwise beyond its upper edge portion, said trunnions resting on the side walls 56 against fulcrum brackets 60 illustrated in detail in Figure 11. The trunnions have crank arms 61 projecting therefrom and are held against the fulcrum brackets by anchored springs 62 which connect with the crank arms 61 and serve to yieldably hold the face wall 58 in its closed position, stops 63 being affixed to the lower edge of the wall in position for engaging as stops against the outer hopper wall 64 in the manner illustrated in Figures 1 and 12 for fixing the normal position of the face wall. The outer wall 64 cooperates with the inner parallel wall 65 in providing a hopper or fall-way in which to receive the cans of the tiers successively pushed into the tier receiving chamber by the step-by-step movements of the ram or pusher head 43. It will be apparent by reference to Figures 1, 9, 10 and 12 of the drawings that the discharge platform H previously referred to takes the form of a receiving floor 66 disposed between the hopper walls 64 and 65 at the bottom of the receiving chamber formed by the side walls 56 and the face wall 58. The floor 66 is normally disposed in the horizontal position illustrated in Figures 10 and 12 of the drawings and is pivotally mounted as at 67. An actuating lever 68 comprising the previously referred to manual control J is secured to the pivot mounting of the receiving floor 66, and said floor has connection at 69 with a floor extension 70 which is normally disposed in the inclined position illustrated in full lines in Figures 9 and 10 and in dotted lines in Figure 1. The free end of the floor extension 70 is equipped with rollers 71 adapted to roll over inclined tracks 72 attached to the hopper walls 64 and 65. The discharge receiving floor 66, 70 is adapted to receive the can tiers in the position illustrated in full lines in Figure 10, and then be moved to the dotted line or inclined position illustrated in said Figure 10 allowing said cans to gravitate onto the feedway chute or conveyor 73 which was previously generally designated I. This manner of receiving and discharging the cans by endwise pushing of the can tiers and then gravity rolling of the cans of the tiers serves to place the cans on the feed-away conveyor 73 without any free falling of the cans which could bring about damaging of the side walls or the end flanges thereof.

In practicing the improved method by use of the herein disclosed apparatus, a bag of cans is placed on the receiving table A manually or by use of the feeder conveyor C as shown in Figure 9. The table A will be in its horizontal position illustrated in Figures 2 and 9 at this time and the mold will be in its normal position illustrated in Figures 2 and 4. With the bag thus mounted on the receiving table A with the cans disposed with their axes uprightly and in parallel relation, the wall of the bag disposed toward the mold D is torn away or removed in the manner illustrated in Figure 4 so as to expose the sides of the cans toward the mold. After the wall of the can bag has been thus removed the operator grasps the handle 29 of the mold D and swings the same upwardly from the position illustrated in Figure 5 to the position illustrated in Figure 8. In this position the bottom 23 of the mold will close over the open wall of the bag, and the side walls 25 and 26 will embrace the bag at opposite sides thereof.

After engaging the table hooks 21 over the pins 37 to lock the table to the mold, the operator again grasps the mold handle 29 and swings the connected mold and table assembly D, A from the position illustrated in Figure 5 to the position illustrated in Figure 8, thus placing the bag of cans in the mold with the bag open toward the bottom 23 of said mold. By now releasing the table hooks 21, the table may be swung back to its normal position illustrated in Figures 2, 3 and 4 of the drawings. The engagement of the mold rod 32 and the stationary hooks 33 permits the swinging of the mold without disrupting the alignment of the rod 32 with the rollers 34 or the engagement of the rod 32 nearest the table A with the underlying rollers 34.

Figures 10, 11:
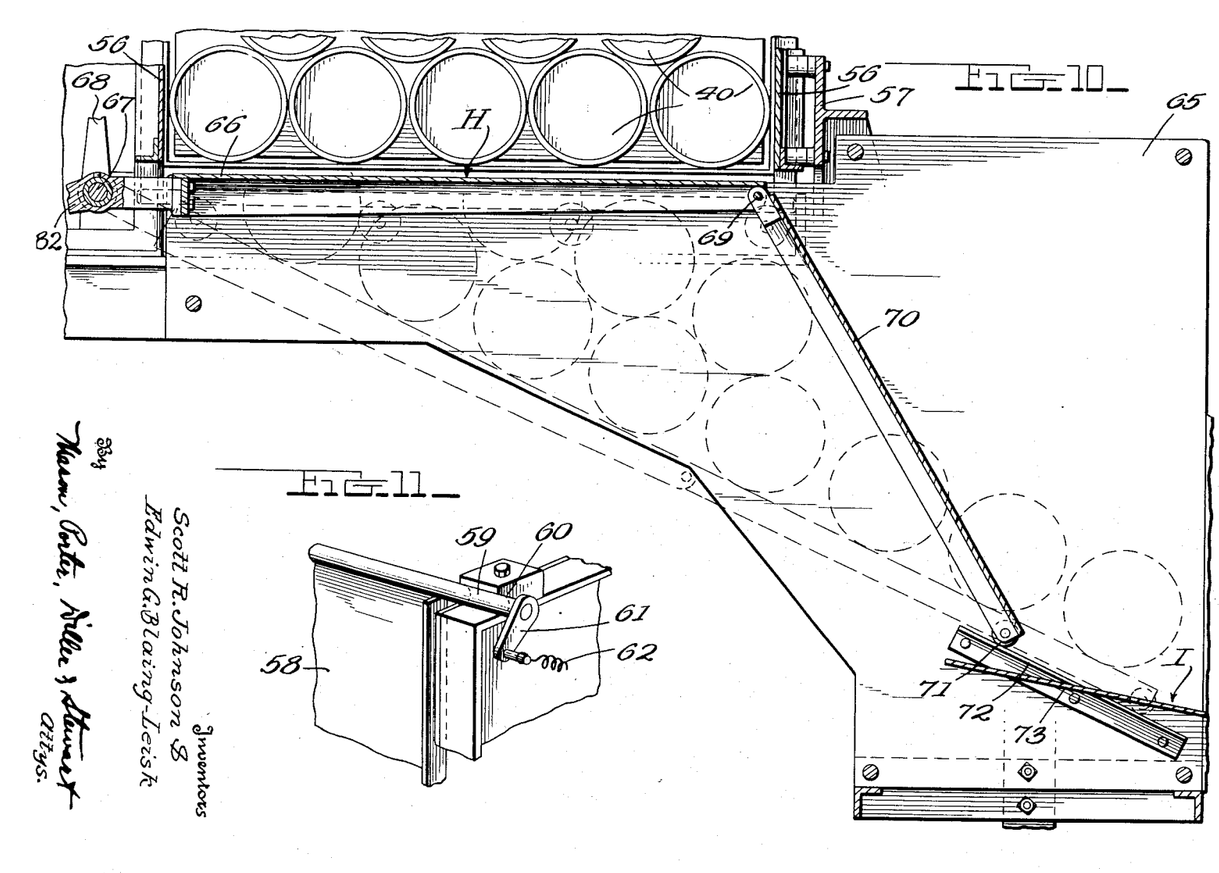
Figure 10 is an enlarged fragmentary vertical longitudinal section taken through the can tier discharging station on the line 10—10 on Figure 2, the tiltable, hinged section discharge chute being shown elevated to the can tier receiving position in full lines and lowered to the can tier discharging position in dotted lines.
Figure 11 is a fragmentary perspective view illustrating the mounting of the yieldable backing wall at the can tier discharging station.
Figures 12, 13:
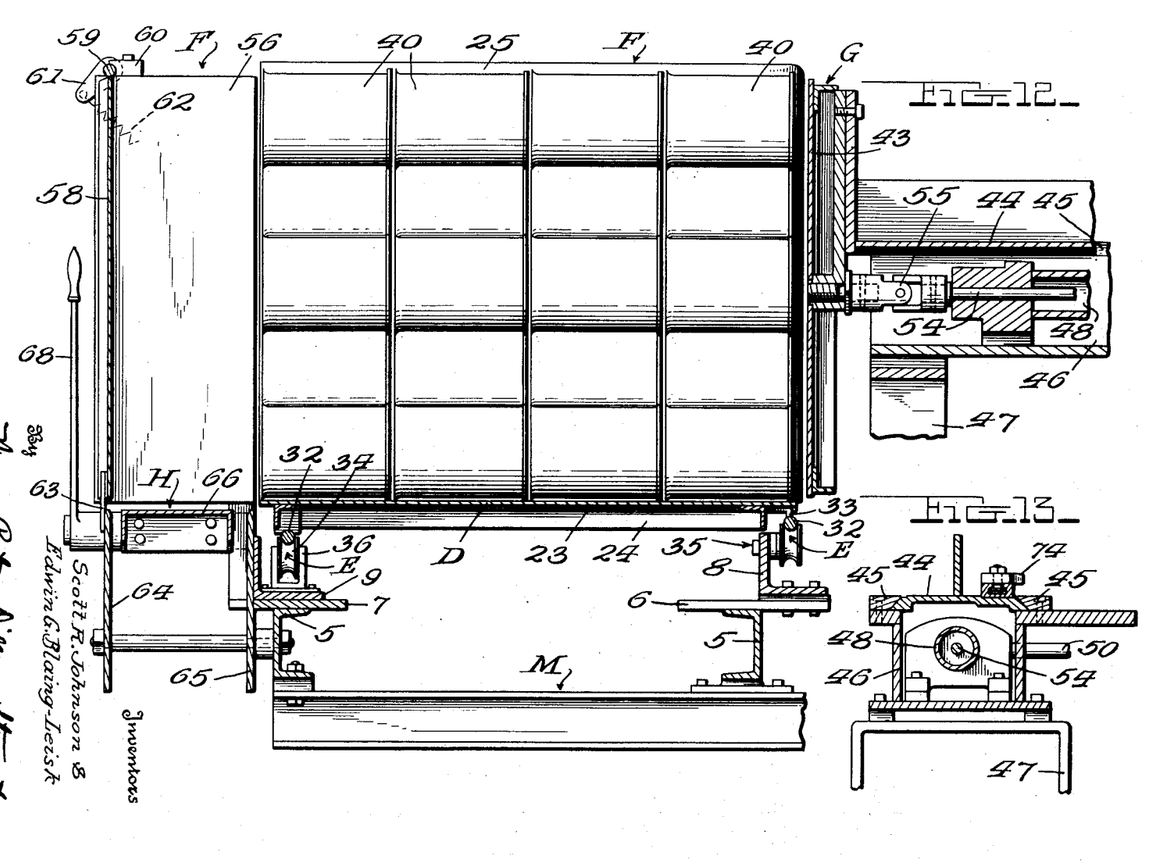
Figure 12 is an enlarged fragmentary horizontal section taken on the line 12—12 on Figure 2.
Figure 13 is an enlarged detail vertical cross section taken on the line 13—13 on Figure 2.

The mold is now moved over the rollers from the receiving station to the discharging station F, in which position it is shown in Figures 9 and 10 of the drawings. In this position the bag 39 is removed upwardly from the bag complement of cans in the manner diagrammatically indicated by the arrow X on Figure 8. The tier sheets 41 also are removed from between the several tiers of cans so as to free and expose the cans in the manner illustrated in Figure 12. It will be obvious that the mold sides 25 and 26 will be effective to confine the cans 40 against rolling after the bag 39 has been removed. Therefore, it is immaterial whether the bag be removed at the receiving station before the mold is shifted over to the discharging station, or at said discharging station. It is preferred, however, that the removal of the bag shall take place at the discharging station just prior to commencing the step-by-step advancement of the pusher head 43.

By now moving the ram or pusher head 43 step-by-step, tiers of cans may be successively pushed into the discharging or receiving chamber defined at the sides by the walls 56, at the face by the wall 58, and at the bottom by the supporting floor 66.

As previously described, each tier of cans is pushed onto the receiving floor 66 while it is in its elevated or horizontal position shown in Fig. 10, and after the tiers of cans have been pushed into the chamber and onto the floor 66 the end lever 68 is manipulated to swing the floor down to its discharging position illustrated in dotted lines in Figure 10 so that the cans can roll by gravity onto the feedway chute 73 without any free falling of the cans which would serve to damage them.

In this example disclosure electrical means, manually controlled, are selected for bringing about the step-by-step advancement of the pusher head 43 effective to push the cans tier-by-tier onto the discharge floor 66, and also the retraction of the pusher head after a bag complement of cans has been discharged by step-by-step advancing movement of said head. For this purpose the pusher slide is equipped with five circuit controlling lugs 74, 75, 76, 77 and 78. The structure and mounting of the circuit controlling lugs is best illustrated in Figures 2, 2a, 9 and 13 of the drawings.

It will be apparent by reference to Figures 14 through 17 of the drawings that the control lugs 74 through 78 are located for serially actuating the switch operating bell cranks 79 and 80 as the pusher head is advanced step-by-step. The pusher head carrying slide 44 also has a switch actuator 81 at its inner end extremity.

Figure 14:
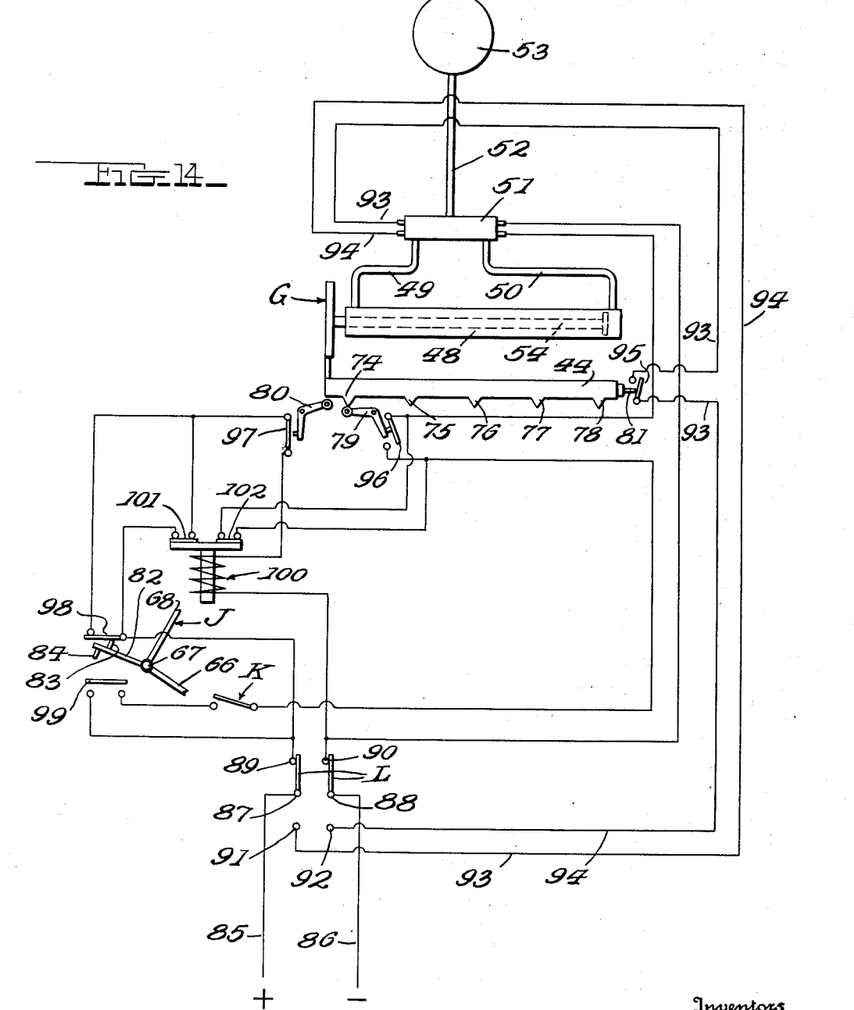
Figures 14, 15, 16 and 17 are diagrammatic views illustrating the electrical controls for controlling the operation of the can tier discharging ram.
Figure 15:
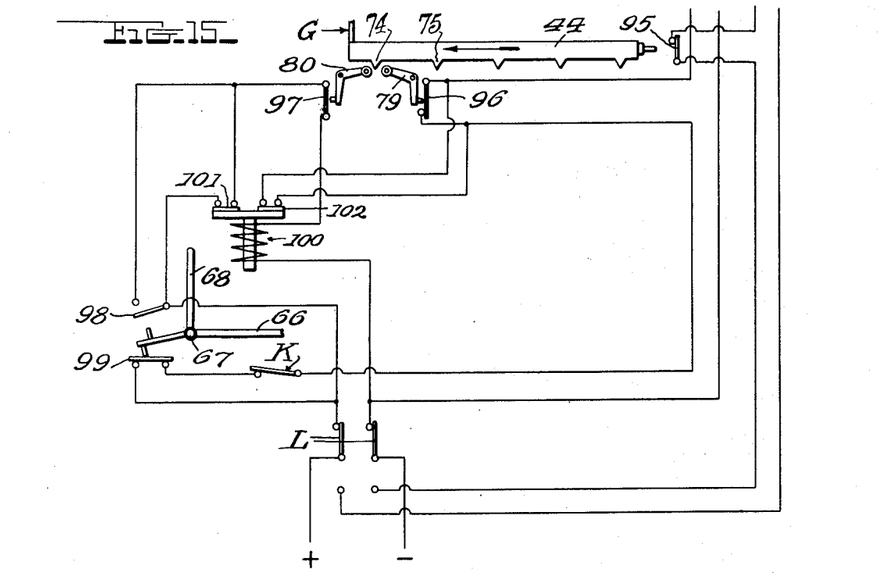

The discharge floor pivot mounting with which the hand lever 68 is connected also has a switch actuator arm extension 82 which is clearly illustrated in Figures 2, 14 and 18 of the drawings. The arm extension is equipped with an upwardly directed switch actuator 83 and downwardly directed switch actuator 84.

In the circuit diagrams illustrated in Figures 14 through 17 the power lines are indicated at 85 and 86 and connect at 87 and 88 with the foot control switch L which, when not depressed, makes contact at 89 and 90 with the forward control circuit, or when depressed following the completion of a step-by-step advance of the pusher head 43 makes contact at 91 and 92 with the return lines 93 and 94 connecting with the solenoid valve 51 through a safety switch 95 which is closed during the advance movements of the plunger head 43, but which is automatically opened when the plunger is returned to its fully retracted position in the manner clearly illustrated in Figure 14.

It will be apparent by reference to Figure 14 that the advance control dog 74 is effective to hold the switch 96 in the forward circuit open whenever the plunger head is fully retracted by reason of its engagement over the actuating bell crank 79.

When the hand lever 68 is moved to lower the can discharging floor 66 to the dotted line position illustrated in Figure 10 and as indicated diagrammatically in Figure 14 it serves to bring about a closing of the switch 98, and when said lever 68 is moved to raise the floor to the full line position illustrated in Figure 10 it brings about a closing of the switch 99 and an opening of the switch 98.

In the control circuits herein diagrammatically illustrated there is included a relay 100 and relay switches 101 and 102 which are opened and closed by operation of said relay.

Referring specifically to Figure 14 it will be seen that when the mold D is in position for having the first tier of cans discharged, the leading dog 74 is positioned for holding the switch 96 open.

The switch 97 is normally closed and the can discharge floor 66 is normally positioned for holding the switch 98 closed, so that when the switch L is disposed in the position shown in Figure 14 the relay 100 will be energized for closing the relay switches 101 and 102.

The floor 66 is then lifted by the operator to the position shown in Figures 1 and 10 which closes the switch 99 and opens the switch 98 and simultaneously the right hand of the operator is utilized to close the safety switch K. This actuates the solenoid valve 51 to direct pressure fluid behind the plunger 54 and starts the forward movement of the ram or pusher G. See Figure 15.

Figure 16:
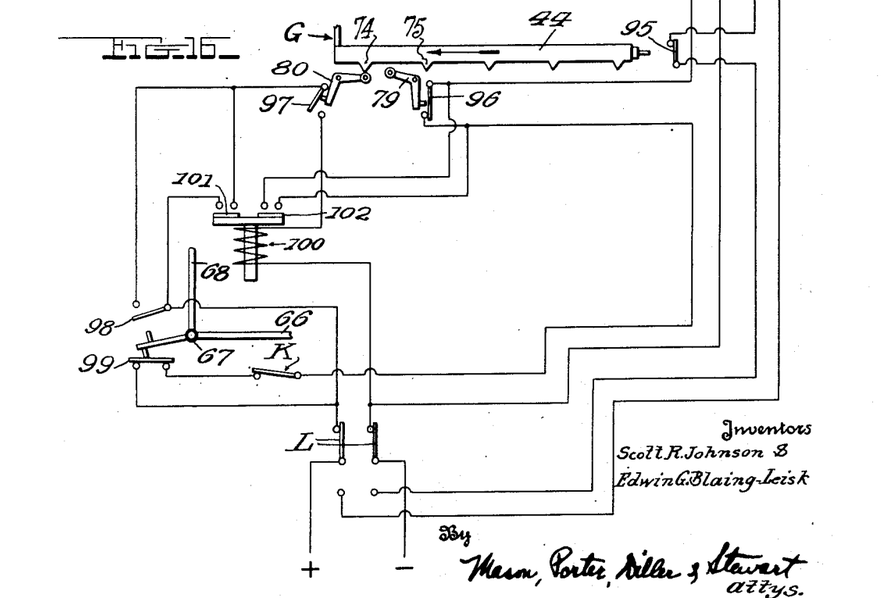

The relay switch 101 holds the relay 100 energized when the switch 98 is opened and the relay switch 102 shunts the switch 96 held open by the dog 74 to permit operation of the ram to be initiated. As the ram G moves forwardly, as in Figure 15, the dog 74 first releases the switch 96 to close, and as the ram continues its forward movement, the dog 74 opens the switch 97 for deenergizing the relay holding circuit as shown in Figure 16. Opening the shunt circuit around the switch 96 conditions the circuit for stopping the ram when the dog 75 opens the switch 96. Continued forward movement of the ram causes the dog 74 to permit the switch 97 to close, but closing the switch 97 will not energize the relay circuit again because the switch 98 remains open.

Figure 17:
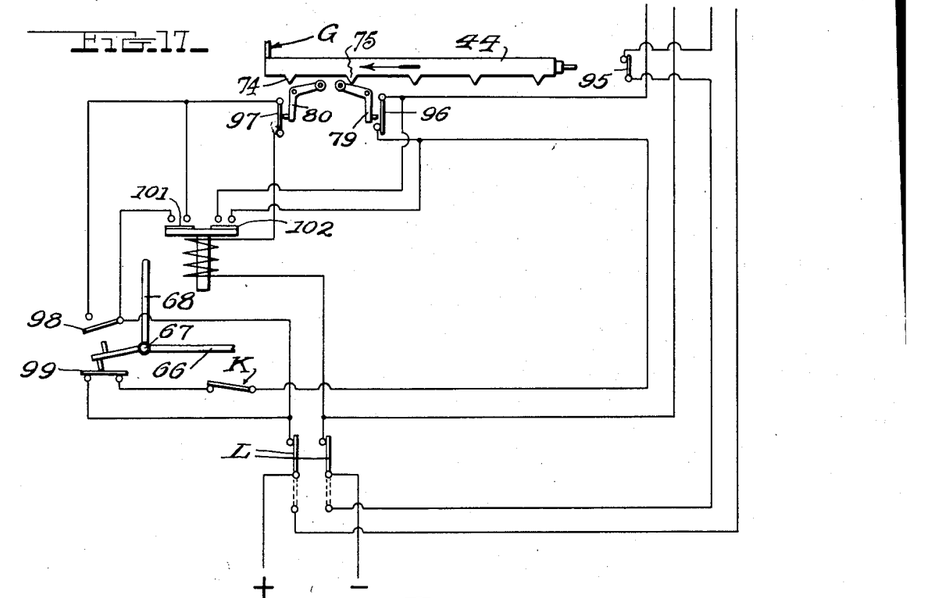

When the dog 75 opens the switch 96 the circuit is opened which stops the ram. Figure 17 shows the switch 97 closed and the dog 75 approaching the switch 96 for stopping the ram. The can floor 66 is then lowered to the position shown in Figure 14 for discharging the first tier of cans, which closes the switch 98 for re-energizing the relay circuit and completing the cycle. The cycle is then repeated for each tier of cans.

As the ram G begins its forward movement for discharging the first tier of cans, the safety switch 95 at the right hand end of the ram is permitted to close so that after the last tier of cans has been discharged by the ram, and the operator shifts the switch L to the alternative leads 91, 92 the solenoid valve will be shifted for retracting the ram to its starting position.

The only reason for employing the hand switch K is to require the operator to use both hands in order to put the ram in motion and thereby avoid any accident which might otherwise result from having the operator place a hand between the end row of cans and the wall of the receiving chamber while the ram is in motion.

The face wall 58 also functions as a safety means since by yieldably mounting this wall, freedom of movement is provided which will prevent injury of the operator or damaging of cans or machine parts in case of a jam.

While one example of apparatus adaptable for the practicing of the herein disclosed method has been illustrated, it is to be understood that parts of this apparatus, and in fact the steps of the method, may be varied without departing from the spirit and scope of the invention as defined in the appended claims.

We claim:

1. A method of unloading cans from a bag wherein the cans are arranged in multiple independent tiers each composed of a plurality of can rows with the can axes in parallel relation, the method comprising removing at least one face only of the bag to expose can sides through the open bag side, confining the bag with the exposed cans in a confining mold with a wall of the mold closing over the open bag side and contacting the cans exposed through said open bag side, the can axes being in substantially upright position, tilting the mold with the bag and cans therein to place the cans with their axes in generally horizontal position, removing the bag from the cans to leave them confined against rolling in the mold, then pushing said cans in the direction of their axes to discharge them tier-by-tier from the mold directly and in horizontal position onto a roll away surface to roll away by gravity action tier-after-tier.

2. A method of unloading cans from a bag wherein the cans are arranged in multiple independent tiers each composed of a plurality of can rows with the can axes in parallel relation, the method including the steps of placing the bag of cans in a confining mold with the can axes in generally horizontal position, removing the bag to leave the bag complement of cans confined against rolling in said mold, then pushing said cans from the mold in the direction of their axes to discharge them tier-by-tier from the mold directly onto a generally horizontal supporting floor while retaining their axes in horizontal position, and tilting the floor after each tier is pushed thereonto to allow the cans to roll away off the floor by gravity action.

3. In apparatus for unloading cans from a bag wherein the cans are arranged in multiple independent tiers each composed of a plurality of can rows with the can axes in parallel relation, a table whereon to support a bag of cans with the can axes upright while a whole side face of the bag is removed to expose can sides through the open bag side, a U-shaped mold placeable about the bag on the table with the base of the U closing over the can sides exposed through the open bag side and the upright walls of the U opposing two opposite bag sides against which can sides lie, said mold being tiltable with the bag and cans therein into position for placing the cans with their axes in generally horizontal position, and said bag being removable from the mold after the tilting thereof to leave the cans supported by the U base and confined against rolling by the upright walls of the U, and a ram movable through the mold for pushing the can tiers therefrom tier-by-tier to roll away by gravity action.

4. In apparatus for unloading cans from a bag wherein the cans are arranged in multiple independent tiers each composed of a plurality of can rows with the can axes in parallel relation, a table whereon to support a bag of cans with the can axes upright while a face of the bag is removed to expose can sides through the open bag side, a U-shaped mold placeable about the bag on the table with the base of the U closing over the can sides exposed through the open bag side and the upright walls of the U opposing two opposite bag sides against which can sides lie, said mold being tiltable with the bag and cans therein into position for placing the cans with their axes in generally horizontal position, and said bag being removable from the mold after the tilting thereof to leave the cans supported by the U base and confined against rolling by the upright walls of the U, a ram movable through the mold for pushing the can tiers therefrom tier-by-tier to roll away by gravity action, and a floor on which to directly receive successively discharged can tiers while in generally horizontal position, thereby to prevent free falling of the cans for any material distance, said floor being tiltable to allow the cans to roll away by gravity action.

5. Apparatus as defined in claim 3 in which the bag supporting table is mounted at a receiving station, the ram is mounted at a discharging station spaced from the receiving station, and the mold is slidable back and forth to receive the bag and cans at the receiving station and move them to the discharging station whereat the bag is removed and the ram is moved through the mold step-by-step to discharge the cans therefrom tier-by-tier.

6. Apparatus as defined in claim 3 in which the mold is swingably mounted so as to be swingable over the table to properly embrace the bag of cans while it is supported on the table, and said table is swingably mounted so as to be swingable with the mold to tilt the bag and move the cans from a position in which their axes are upright to one in which they are lying on their sides with their axes in generally horizontal position.

7. Apparatus as defined in claim 3 in which the mold is swingably mounted so as to be swingable over the table to properly embrace the bag of cans while it is supported on the table, and said table is swingably mounted so as to be swingable with the mold to tilt the bag and move the cans from a position in which their axes are upright to one in which they are lying on their sides with their axes in generally horizontal position, and in which there is also included dashpot means having connection with the table and effective to cushion swinging movement thereof.

8. Apparatus as defined in claim 3 in which the mold is swingably mounted so as to be swingable over the table to properly embrace the bag of cans while it is supported on the table, and said table is swingably mounted so as to be swingable with the mold to tilt the bag and move the cans from a position in which their axes are upright to one in which they are lying on their sides with their axes in generally horizontal position, and in which there is also included means for connecting the table and mold to move together in tilting the bag to place the cans in generally horizontal position, and dashpot means effective to cushion swinging movement of the table both independently of the mold and also in unison with the mold.

9. Apparatus as defined in claim 3 in which the bag supporting table is mounted at a receiving station, the ram is mounted at a discharging station spaced from the receiving station, and the mold is slidable back and forth to receive the bag and cans at the receiving station and move them to the discharging station whereat the bag is removed and the ram is moved through the mold step-by-step to discharge the cans therefrom tier-by-tier, said mold having a pair of slide rods depending from its base and engageable over rollers placed to provide a slideway between the receiving station and the discharging station.

10. Apparatus as defined in claim 3 in which the bag supporting table is mounted at a receiving station, the ram is mounted at a discharging station spaced from the receiving station, and the mold is slidable back and forth to receive the bag and cans at the receiving station and move them to the discharging station whereat the bag is removed and the ram is moved through the mold step-by-step to discharge the cans therefrom tier-by-tier, said mold having a pair of slide rods depending from its base and engageable over rollers placed to provide a slideway between the receiving station and the discharging station, and there being included hook means removably engageable by one mold rod as a swing pivot means at the receiving station, and stop means for accurately placing the mold at said receiving station.

11. Apparatus as defined in claim 4 in which there is included manually controlled power operated means for moving the ram, said last named means including two manually operable control devices which must be simultaneously engaged each by one hand of the operator in the controlling of movement of the ram so that the operator will not have a hand free to engage with moving parts of the apparatus during movement of the ram, and in which one of said manually operable devices constitutes the means for determining the position of the can tier receiving floor.

12. In apparatus for unloading cans from a bag wherein the cans are arranged in multiple independent tiers each composed of a plurality of can rows with the can axes in parallel relation, a table whereon to support a bag of cans with the can axes upright while a face of the bag is removed to expose can sides through the open bag side, a U-shaped mold placeable about the bag on the table with the base of the U closing over the can sides exposed through the open bag side and the upright walls of the U opposing two opposite bag sides against which can sides lie, said mold being tiltable with the bag and cans therein into position for placing the cans with their axes in generally horizontal position, and said bag being removable from the mold after the tilting thereof to leave the cans supported by the U base and confined against rolling by the upright walls of the U, a ram movable through the mold for pushing the can tiers therefrom tier-by-tier to roll away by gravity action, and a receiving chamber in which to receive the can tiers as they are serially pushed from the mold by the ram, said chamber being defined by spaced upright can confining side walls and a floor on which to directly receive the cans while in generally horizontal position, thereby to prevent free falling of the cans for any material distance, said floor being tiltable to allow cans to roll away by gravity action.

13. In apparatus for unloading cans from a bag wherein the cans are arranged in multiple independent tiers with their axes in parallel relation, a table whereon to support a bag of cans with the can axes upright while a face of the bag is removed to expose can sides through the open bag side, a U-shaped mold placeable about the bag on the table with the base of the U closing over the cans exposed through the open bag side and the upright walls of the U opposing two opposite bag sides against which can sides lie, said mold being tiltable with the bag and cans therein into position for placing the cans with their axes in generally horizontal position, and said bag being removable from the mold after the tilting thereof to leave the cans supported by the U base and confined against rolling by the upright walls of the U, a ram movable through the mold for pushing the can tiers therefrom tier-by-tier to roll away by gravity action, and a receiving chamber in which to receive the can tiers as they are serially pushed from the mold by the ram, said chamber being defined by spaced upright can confining side walls, a yieldably mounted face wall yieldably displaceable by cans pushed thereagainst by the ram, and a floor on which to receive the cans while in generally horizontal position, thereby to prevent free falling of the cans for any material distance, said floor being tiltable to allow cans to roll away by gravity action.

SCOTT R. JOHNSON.
EDWIN G. BLAING-LEISK.

References Cited in the file of this patent

UNITED STATES PATENTS

| Number | Name | Date |
|---|---|---|
| 1,451,450 | Smith | Apr. 10, 1923 |
| 1,487,076 | Pilley | Mar. 18, 1924 |
| 1,622,518 | Johnson | Mar. 29, 1927 |
| 1,632,204 | Threefoot et al. | June 14, 1927 |
| 1,869,653 | Bauer | Aug. 2, 1932 |
| 1,906,126 | Mott | Apr. 25, 1933 |
| 1,954,944 | Olney | Apr. 17, 1934 |
| 2,210,886 | Dewey | Aug. 13, 1940 |
| 2,321,171 | Yanchenko | June 8, 1943 |
| 2,508,861 | Jessen | May 23, 1950 |